April 13, 1954
T. A. BURTIS ET AL
2,675,275
APPARATUS FOR ELEVATING GRANULAR MATERIAL
Filed Dec. 4, 1950
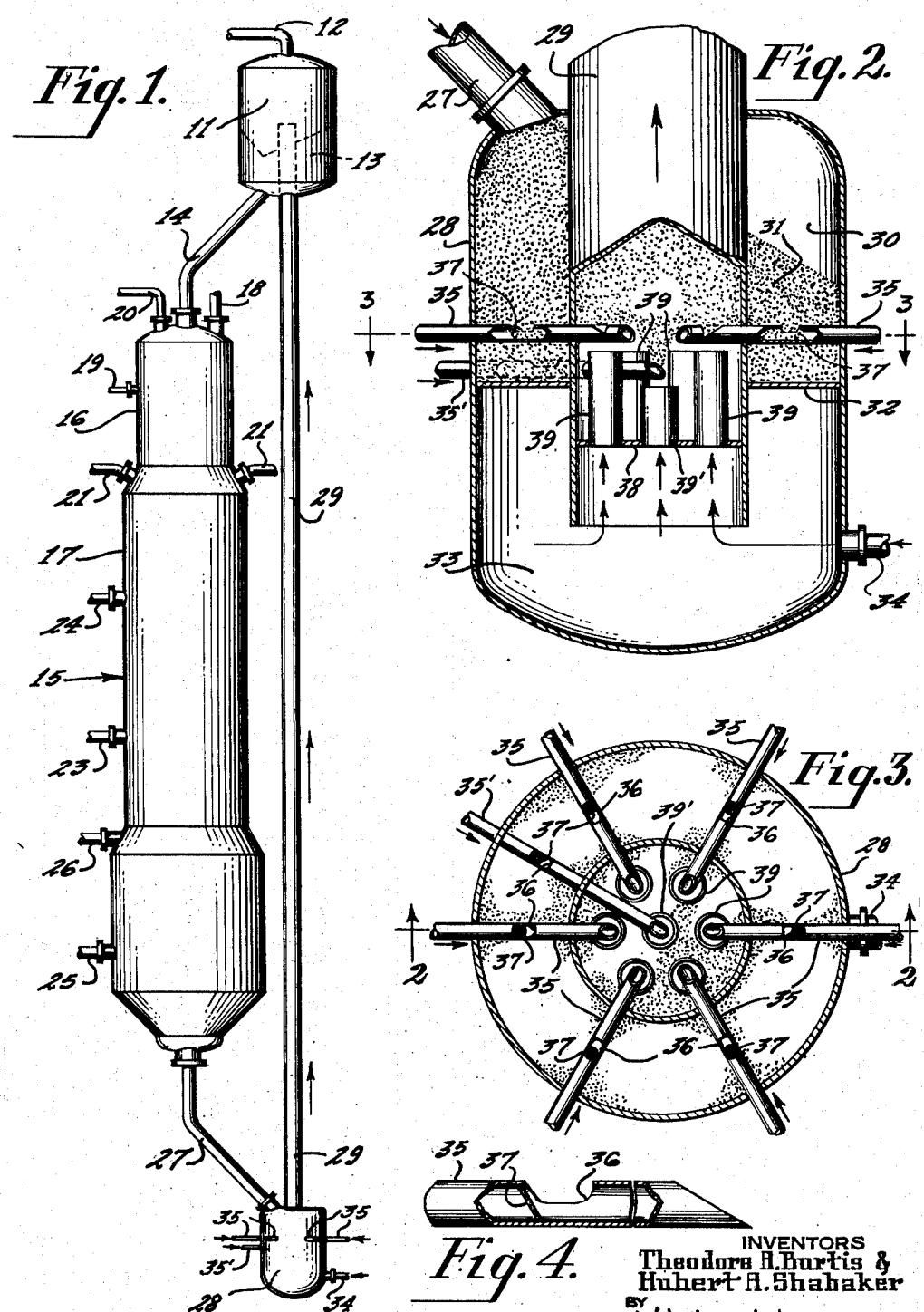
INVENTORS
Theodore A. Burtis &
Hubert A. Shabaker
BY
William P. ...
ATTORNEY

UNITED STATES PATENT OFFICE 2,675,275

APPARATUS FOR ELEVATING GRANULAR MATERIAL

Theodore A. Burtis and Hubert A. Shabaker, Media, Pa., assignors to Houdry Process Corporation, Wilmington, Del., a corporation of Delaware Application December 4, 1950, Serial No. 199,094

13 Claims. (Cl. 302—57)

This invention relates to apparatus for elevating granular material by means of a gaseous lift medium, particularly as applied to gas lift systems employed in the chemical processing and petroleum refining industries, wherein granular contact material, such as catalyst, in the form of beads or pellets is continuously circulated through one or more treating zones, the contact material gravitating downwardly through the treating zones and then being elevated for reuse by means of a gas lift.

Typical of the systems to which the present invention may be applied is that illustrated and described in an article entitled "Houdriflow: New design in catalytic cracking," appearing at page 78 of the January 13, 1949, issue of the "Oil and Gas Journal." The article discloses, briefly, a catalytic cracking system for the refining of hydrocarbons comprising an elongated vessel having superimposed reactor and regenerator sections connected to form a downflow path through which catalyst in the form of beads or pellets is passed by gravity flow. The catalyst is supplied to the downflow path from an upper lift hopper disposed at an elevation substantially above the upper end of the vessel, and is withdrawn from the lower end thereof and passed downwardly into a lower lift hopper. In the connecting conduits of the downflow path the catalyst gravitates as a compact non-turbulent column, and within the chambers of the vessel which form contact zones for engagement of the catalyst with gaseous reactants, the catalyst gravitates in the form of a compact non-turbulent moving bed.

The lower lift hopper provides an introduction chamber, or engaging zone, wherein the catalyst is engaged by the gaseous lift medium and carried thereby into and upwardly through a lift pipe which extends from a low point within the introduction chamber upwardly to a point within the upper lift hopper.

Among the problems to be overcome in elevating solid granular material by pneumatic means, are erosion of the equipment, especially at such points within the lift system where the solid particles are caused to undergo a change of direction while being rapidly accelerated, and attrition of the pellets or beads caused by their impact with the wall surfaces of the equipment and by collision with other particles of the granular material. The amount of such erosion and attrition is, to some extent, dependent upon the amount of turbulence and random motion within the moving stream of solid particles, the collisions caused by such turbulence tending to erode and fracture the particles, with consequent production of fines which must be removed from the system to maintain efficient operation of the process and of the circulation system. Obviously, attrition represents a direct loss of contact mass to the operation, and is therefore an important factor in the overall economics of that operation.

It has been found that the problems of erosion and attrition, as well as the problem of maintaining general efficient operation of the lift, is overcome to a considerable extent when the material to be elevated is introduced into the inlet end of the lift path as a smooth-flowing stream of relatively uniform particle distribution, and is thereafter conveyed along the lift path in substantially straight-line flow, without appreciable turbulence or random motion of the solid particles. The flow characteristics of the granular material being conveyed upwardly along the lift path is determined to appreciable extent by the manner in which it is introduced into the lift path. It is therefore especially desirable to insure that the granular material will be engaged by the stream of lift gas, and will be accelerated along at least the initial portion of the lift path, in such manner as to provide the desired characteristics of flow throughout the remaining portion of the lift path.

In accordance with the present invention, lift gas is started upwardly along a confined path which, at a higher point, becomes the lift path. At several levels in the lower portion of said confined path granular material is introduced into the upwardly flowing stream of lift gas through lateral confined feeder paths which project into the confined path and discharge granular material at a plurality of points uniformly distributed across the flow area of the confined path. The granular material is supplied to the confined feeder paths together with relatively small amounts of additional lift gas sufficient only to convey the material through the feeder paths to the points of discharge within the confined path. Preferably, though not necessarily, the granular material is supplied to the confined path from an annular confined zone established about the lower end portion of the confined path and forming therewith the lower lift hopper of the pneumatic lift system. The granular material is passed downwardly within the annular confined zone in the form of a compact, nonturbulent bed continuously covering the granular material inlets to the confined feeder paths. Lift gas is introduced into the annular lift hopper to convey the granular material as a slowly moving stream into and through the feeder paths to the points of discharge within the confined path, such gas being introduced at one or more points within the annular zone.

In a preferred embodiment of the invention, though not limited thereto, lift gas is introduced adjacent to the feeder path inlets in streams discharging axially into the feeder paths. There is thus provided an incremental introduction of granular material vertically along the lower end portion of the confined path. Below the region of solids introduction into the confined path, the upwardly moving lift gas is channeled into a series of elongated risers, individual to each of the lateral feeder paths. The risers are of substantially greater flow area than the feeder paths, and are arranged with their axes parallel to the axis of the confined path. Each riser terminates immediately below the discharge point of its associated feeder path, so that each of the plurality of rising gas streams will envelop its associated feeder path outlet. The primary lifting force is supplied by the lift gas passing through the risers in the lower end of the confined path. The lift gas introduced into the compact moving bed of granular material within the supply zone adjacent the inlet ends of the lateral feeder conduits is supplied in quantity sufficient only to convey the granular material as a low-velocity smooth-flowing stream to the point of discharge within the confined path, where engagement by the high velocity gas stream surrounding the solids discharge point changes its flow from a lateral to an axial direction, relative to the confined path, before the solids are carried within the confined path for any substantial distance laterally toward the axis thereof.

For a fuller understanding of the invention, reference may be had to the accompanying drawing forming a part of this application, in which:

Figure 1 diagrammatically illustrates a typical hydrocarbon conversion system, including a gas lift for circulating granular material, to which the method and apparatus of the present invention may be applied.

Figure 2 is an enlarged sectional elevation of the lower lift hopper, or introduction chamber, illustrating the method and apparatus by which the granular material is conveyed laterally into the confined path at various levels and at uniformly distributed points across the flow area thereof, and is engaged therein by upwardly moving lift gas which carries the granular material upwardly through the lift portion of the confined path;

Figure 3 is a plan view, in section, taken along the line 3—3 of Figure 2; and

Figure 4 is a fragmentary view of a granular material feeder tube.

Referring to Figure 1 of the drawing, catalyst in the form of granules, pellets, etc. is supplied to the downflow path of the hydrocarbon processing system from a lift hopper 11, to which the catalyst has previously been elevated by means of a pneumatic lift. Lift hopper 11 includes a disengaging zone or chamber wherein the catalyst is separated from the lift gas, the latter being removed through gas outlet line 12, and the catalyst 13 being continuously withdrawn from the lower end of the lift hopper 11 through a seal leg 14 and introduced into the upper end of a processing vessel 15 comprising an upper reactor section 16 and a lower regenerator section 17 of greater diameter than the reactor section.

Liquid hydrocarbon feed is supplied to the reactor section 16 of vessel 15 through inlet line 18. As will be understood to those familiar with the art, hydrocarbon vapors may accompany the liquid hydrocarbon as part of the feed charge. Section 16 includes a reaction chamber wherein the liquid hydrocarbon feed is contacted with the catalyst introduced through seal leg 14 to carry out the desired hydrocarbon conversion. Process steam may be introduced into the reaction chamber through inlet line 19, and steam or any other suitable inert gas may be introduced at the upper end of vessel 15 through inlet line 20 for the purpose of providing a gas seal in the seal leg 14. The catalyst, which has become spent by reason of a carbonaceous deposit formed thereon during the reaction, together with the gaseous products of reaction pass downwardly by gravity flow from the reaction zone at the lower end of section 16 into a solids-vapor disengager section located at the upper end of the enlarged regenerator section 17, wherein the gaseous reaction products are separated from the spent catalyst. The gaseous reaction products are withdrawn from the vessel 15 through vapor outlets 21. The separated spent catalyst gravitates downwardly through a purging section wherein it is contacted with a stripping gas, such as steam, introduced through inlet 22. The purge steam and the vaporizable material removed from the spent catalyst, together with the separated gaseous material, pass out of the vessel 15 through the vapor outlets 21. From the purging section, the spent catalyst gravitates in known manner through internal seal legs into the regenerating zone of regenerator section 17. Within the regenerating zone, the spent catalyst undergoes in known manner successive stages of regeneration. In the upper stage, oxygen-containing gas introduced through inlet 23 passes counter-currently to the flow of catalyst. The gaseous products formed in the upper stage of regeneration are removed from vessel 15 through flue gas outlet 24. From the first stage of regeneration the catalyst gravitates downwardly to the second stage of regeneration, intermediate cooling by indirect heat exchange with a circulating medium being provided, if desired. Oxygen-containing gas is supplied to the lower stage of regeneration through inlet 25, and the gaseous products of regeneration are removed from the upper end of the second regenerating stage through flue gas outlet 26.

At the lower end of vessel 15 regenerated catalyst is withdrawn through seal leg 27 and introduced into the upper end of lower lift hopper 28. Lift gas introduced into lift hopper 28 engages the regenerated catalyst and conveys it into and upwardly through a substantially vertical lift pipe 29 to the upper lift hopper 11. A more detailed description and illustration of the processing portion of the hydrocarbon conversion system is not given for the reason that the invention is directed to the pneumatic lift portion of the system, and particularly the inlet end thereof.

A clearer illustration of the method and apparatus by which such engagement of lift gas and catalyst may be effected in accordance with the present invention, will be had by reference to Figures 2 and 3, which show enlarged sectional views of the lower lift hopper 28 and the portion of the lift pipe 29 associated therewith.

Referring to Figs. 2 and 3, the lower end portion of the lift pipe 29 is enclosed within a housing member 28 which forms the lower lift hopper. The annular space 30 between the lift pipe 29 and the lift hopper 28 forms a catalyst chamber for receiving catalyst discharging from seal leg 27, the catalyst being maintained within the chamber 30 as a downwardly moving bed 31.

The lower end of annular catalyst chamber 30 is defined by an annular partition member 32 extending horizontally from the outer wall of the lift pipe 29 to the inner wall of hopper 28. The free space at the lower end of hopper 28 below partition member 32 forms a gas chamber 33 in open communication with the lower end of lift pipe 29. Lift gas is introduced into chamber 33 through inlet line 34 connected to a source of lift gas, not shown.

The outer ends of catalyst feeder conduits 35 and 35' are connected to a source of lift gas, not shown, and the inner ends thereof project radially into the lift pipe. The catalyst feeder conduits 35 and 35' are situated at different levels along the lower portion of the lift pipe, six feeder conduits 35 being provided at one level therein, and one feeder conduit 35' being provided at a lower level. The discharge end of conduit 35' is at the axis of the lift pipe, and the discharge ends of conduits 35 are equi-spaced along a circle about the same axis. In plane projection, as illustrated in Fig. 3, the discharge ends of the catalyst feeder conduits 35 and 35' are substantially uniformly distributed across the flow area of the lift pipe. Although feeder conduits 35 and 35' have been shown in the drawing in horizontal position, it is contemplated that the feeder conduits may, if desired, be inclined at an angle to the horizontal, or may have at least their discharge ends directed upwardly in such manner as to provide an upward movement to the catalyst upon discharge into the lift pipe.

The portion of each feeder conduit 35 and 35' submerged within the moving bed 31 is provided with an opening 36 on its upper side, so that the catalyst moving downwardly in bed formation within chamber 30 may descend into the feeder conduits and be carried by the streams of lift gas passing therethrough to the discharge points within the lift path. Screens 37 are provided at the upstream side of each opening 36, as shown in Fig. 4. As herein stated, the quantity of lift gas supplied to feeder conduits 35 and 35' is sufficient only to convey the catalyst in relatively slow-moving streams laterally into the lift pipe. Within the lift pipe, and spaced a substantial distance below the lowermost feeder conduit 35', a tube sheet 38 extends across the confined path. A series of riser tubes 39 and 39', set at their lower ends in the tube sheet 38, extend upwardly within the lift pipe parallel to the axis of the lift pipe. The riser tubes 39 are of substantially greater diameter than the feeder tubes 35 and 35'. A separate riser tube 39 terminates directly beneath the discharge end of each feeder conduit, so that, as the catalyst is discharged from the feeder conduit into the lift pipe, it is immediately enveloped by the stream of lift gas discharging from the upper end of its associated riser tube and carried upwardly along the lift path. The lift gas introduced into chamber 33 through inlet line 34 is supplied in major amount with respect to the total supply of lift gas, so as to provide the major lifting force for carrying the granular material upwardly through the lift path portion of the lift pipe. The riser tubes 39 and 39' are of sufficient length to assure a straight-line flow of gas from the discharge ends thereof, thus providing in the zone of catalyst introduction a series of parallel gas streams, each engaging the catalyst discharging from its associated feeder conduit, abruptly changing its direction of flow, and carrying it upwardly along the lift path to a point above where the separate catalyst streams merge to form a common stream.

The described method and arrangement of apparatus for pneumatically introducing granular material into the lift pipe assures a substantially uniform distribution of the granular material across the flow area of the lift path. By introducing the granular material at different levels within the lift path as well as at uniformly distributed points across the flow area thereof, a smooth initial movement of catalyst along the lift path is readily obtained. When the catalyst streams rising from the discharge points of feeder conduits 35 and 35' merge at some level above the levels of catalyst introduction, the combined stream will have a substantially uniform lateral particle distribution. By the method of this invention, it is possible to introduce the granular material into the lift path, and to accelerate its movement upwardly therethrough, without creating zones of excessive turbulence, or of undesirable solids concentration, which might impair the efficient operation of the lift system.

As an alternative procedure, the lift gas for conveying catalyst through feeder conduits 35 and 35' may be introduced as bed gas directly into the chamber 30. By bed gas is meant any gas which is introduced either directly into the moving bed or into the free space above the surface of the moving bed. In either case the point of gas introduction is sufficiently remote from the catalyst inlets to the feeder tubes so as to provide a concurrent movement of gas and solids as a compact non-turbulent mass through a substantial portion of the bed toward the inlets of the feeder tubes.

In any case, however, such feeder-tube gas constitutes only a minor portion of the total lift gas, not to exceed about 15% by volume, and is sufficient in amount merely to convey the catalyst at the desired rate to the points of discharge within the lift path. The major portion of the lift gas is introduced into the lower end of the lift pipe and, after passing through the series of riser tubes 39 and 39', provides high velocity streams of lift gas below and surrounding each point of catalyst discharge. By reason of the smooth flow and uniform distribution of solids in the lower portion of the lift path, desirable characteristics of flow throughout the remainder of the lift path are readily obtained.

Exemplifying a typical lift operation in accordance with the present invention, as applied, for example, to the system illustrated in Figure 1, reference may be had to the following data based on a lift pipe height of about 150–200 ft. and a lift pipe diameter (internal) of about 19 inches. Catalyst:

| | |
|---|---:|
| Particle diameter_____in__ | 0.13 |
| Particle density_____lbs./cu. ft__ | 75 |
| Bulk density_____lbs./cu. ft__ | 50 |
| Linear velocity at top of lift_____ft./sec__ | 30 |
| Catalyst circulation rate (tons/hr.)_____ | 162 |
| Total air rate (S. C. F. M.) at 1050° F_____ | 3460 |
| Air to secondary gas inlet (S. C. F. M.)____ | 520 |

Obviously many modifications and variations of the invention as hereinbefore set forth may be made without departing from the spirit and scope thereof, and therefore only such limitations should be imposed as are indicated in the appended claims.

We claim as our invention:

1. Apparatus for elevating granular material by means of a gaseous medium comprising a lift pipe, a housing surrounding the lower end portion of said lift pipe, a transverse annular partition extending between said lift pipe and said housing and dividing said housing into an annular upper chamber and a lower chamber, said lower chamber being in open communication with the lower end of said lift pipe, means for introducing granular material into the upper region of said annular upper chamber, means for feeding said granular material as a plurality of confined streams laterally through the wall of said lift pipe from the lower region of said annular upper chamber to a plurality of discharge points located inwardly from the sides and above the lower end of said lift pipe, said discharge points being distributed uniformly over the cross-sectional flow area of said lift pipe, means for introducing lift gas into said annular upper chamber, and means for introducing lift gas into said lower chamber.

2. Apparatus as defined in claim 1 including means within said lift pipe below said discharge points for channeling the flow of said lift gas introduced into said lower chamber into separate confined streams each discharging immediately below one of said discharge points and immediately thereafter substantially completely enveloping the same.

3. Apparatus as defined in claim 2 in which said discharge points are disposed at a plurality of levels within said lift pipe, the discharge points in the lowermost level being situated nearest the axis of said lift pipe, and the discharge points at succeeding levels being situated progressively nearer the inner walls of the lift pipe.

4. Apparatus as defined in claim 1 in which said means for introducing lift gas into said annular upper chamber discharges said lift gas axially toward the initial end of each of said confined streams.

5. Apparatus as defined in claim 4 in which said means for feeding said granular material and said means for introducing lift gas into said annular chamber comprise elongated conduits extending laterally through both the housing and the lift pipe walls, each of said conduits having on its upper side a granular material inlet in open communication with said annular upper chamber, the portion of said conduit forward of said inlet providing a granular material feed passage, and the portion rearward of said inlet providing a gas introduction passage.

6. Apparatus as defined in claim 5 including transverse screen members covering the discharge ends of said gas introduction passages to prevent the admission of granular material therein.

7. Apparatus for elevating contact material from a lower vessel containing a body of the material to an upper vessel which comprises an elevating conduit having its lower inlet end extending into the lower vessel, a plurality of conduits extending laterally of the vessel and having their inner ends in communication with the elevating conduit adjacent its lower end, said conduits being apertured to receive contact material continuously from the lower vessel, means in communication with the outer ends of the conduits for supplying a fluid medium to each of said conduits to convey the contact material to the inlet end of the elevating conduit and other means for supplying a fluid stream upwardly and into the inlet end of the elevating conduit to lift the material to the upper vessel.

8. Apparatus for elevating contact material from a lower vessel containing a body of the material to an upper vessel which comprises an elevating conduit having its lower inlet end extending into the lower vessel, a plurality of conduits extending laterally of the vessel and having their inner ends in communication with the elevating conduit adjacent its lower end and their outer ends in communication with a fluid manifold, said conduits being apertured to receive contact material continuously from the lower vessel, means for supplying a fluid medium to said manifold to convey the contact material through the conduits to the inlet end of the elevating conduit and a vertical conduit having its upper end positioned adjacent the inlet end of the elevating conduit to direct the material upwardly thereof.

9. Apparatus for elevating granular material through a lift pipe by means of a gaseous medium which comprises: means for passing said granular material downwardly as a confined compact moving bed about the lower end portion of said lift pipe, feeder means for conveying said granular material from a plurality of receiving locations within said bed to a plurality of discharge locations within the lower region of said lift pipe, means for introducing lift gas into said bed to engage said granular material and convey it through said feeder means, and means for introducing lift gas directly into said lift pipe as a plurality of upwardly directed streams individual to and introduced directly beneath said discharge locations.

10. Apparatus as defined in claim 9 in which said means for introducing lift gas directly into said lift pipe has a discharge flow area substantially greater than the discharge flow area of said granular material feeder means, whereby the streams of lift gas and granular material discharging from the latter are individually completely enveloped within and accelerated upwardly by the streams of lift gas introduced directly beneath said discharge locations.

11. Apparatus as defined in claim 9 in which said means for introducing lift gas into said bed is individual to and discharges axially into each of said feeder means.

12. Apparatus as defined in claim 11 in which each of said means for introducing lift gas into said bed and its corresponding feeder means comprise a single conduit having an opening in communication with and adapted to receive granular material by gravity flow from said bed.

13. Apparatus as defined in claim 9 in which said feeder means discharge locations are disposed at a plurality of levels within the bottom region of said lift pipe and are uniformly distributed over the cross-sectional area thereof, the lowermost locations being nearest the axis of the lift pipe.

References Cited in the file of this patent

UNITED STATES PATENTS

| Number | Name | Date |
|---|---|---|
| 299,270 | Sachs | May 27, 1884 |
| 655,305 | Mudd | Aug. 7, 1900 |
| 1,339,977 | Pruden | May 11, 1920 |
| 1,390,974 | Von Porat | Sept. 13, 1921 |
| 1,749,817 | Hermsdorf | Mar. 11, 1930 |